March 15, 1927.  I. BRASA  1,620,942.
TYPEWRITER
Filed Feb. 16, 1925
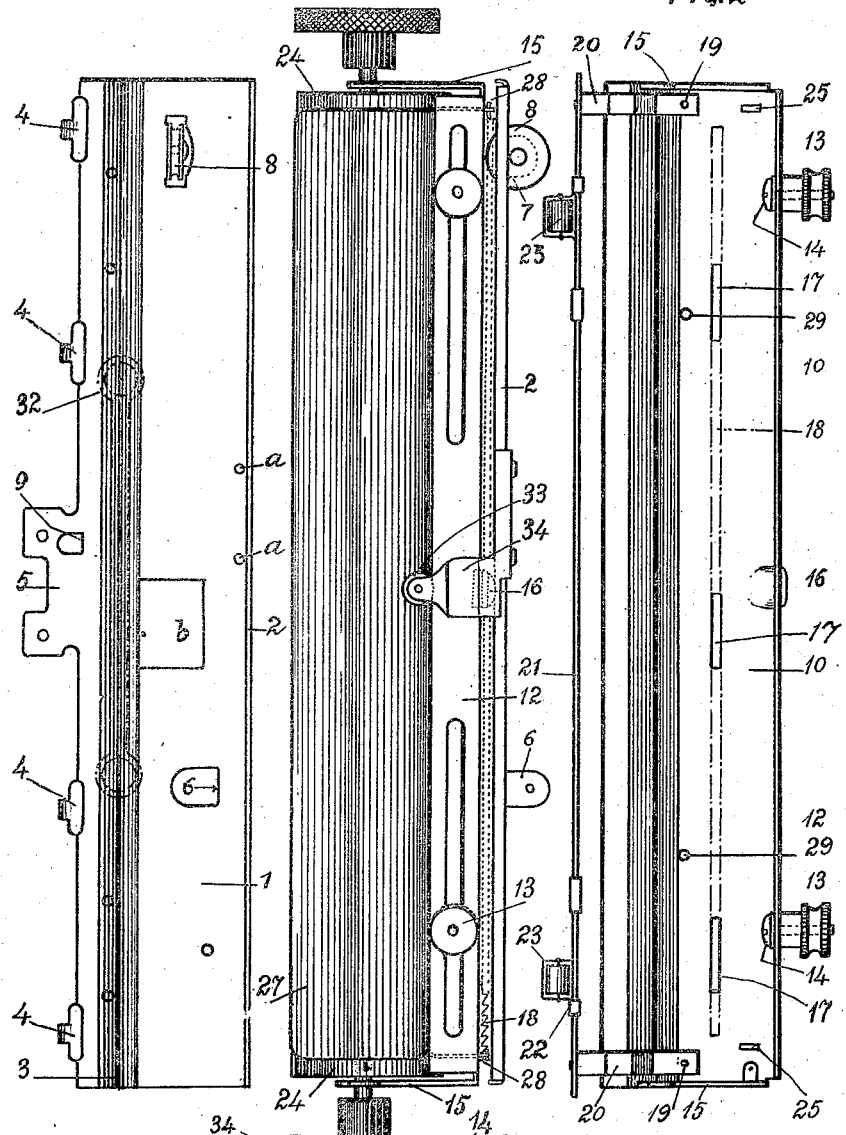
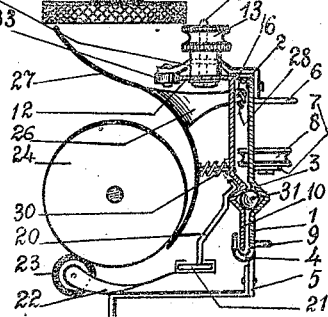
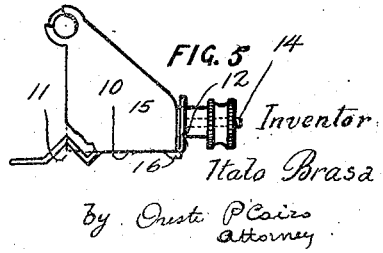
Inventor
Italo Brasa
by Oreste P Cairo
Attorney Patented Mar. 15, 1927.

1,620,942

UNITED STATES PATENT OFFICE.

ITALO BRASA, OF MILAN, ITALY.

TYPEWRITER.

Application filed February 16, 1925, Serial No. 9,637, and in Italy February 18, 1924.

The present invention relates to writing machines or typewriters of the kind having a carriage of sheet metal and running on ball bearings.

A first object of my invention is to provide a carriage simple in construction, effective and durable in working and involving a cheap cost of production.

A further object of my invention is to provide a form of carriage, composed of solid members, with apertures, perforations turned up sections, channels, slots, all in a compact piece, capable of being produced by few shearing and pressing operations, and avoiding as far as possible fitting work.

The invention will now be described with reference to the annexed drawing in which:—

Fig. 1 is a plan view of the bed member of the carriage.

Fig. 2 is a plan view of the carriage member.

Fig. 3 is an elevational back view of the assembled bed and carriage.

Fig. 4 is a section on line A—B of Fig. 3 and showing a few details connected with the invention.

Fig. 5 is a side elevational view of the carriage as represented in Fig. 2.

A principal feature of the invention is the provision of a carriage and a bed plate having all parts produced by few shearing and pressing operations.

A further feature is the provision, on each member, of a single channel, forming a raceway for rolling balls, the two members being further in contact to one another at one point of the back turned up edges.

The stationary bed member —1— which will be fastened at the back portion of the typewriter body in a manner known to persons of the art, is rectangular in form and has a back portion —2— turned upwards at right angle. A longitudinal groove —3— has the peculiarity of being wedge like in section, to secure a durable frictionless raceway for rolling balls —31—.

The forward edge is provided with T-like turned over projections —4— and with a plate support —5— for the ribbon device.

The turned up portion —2—, the groove —3—, the projections —4—, the tongue-like projection —6— for the attachment of the bell lever, the tongue-like projection —7— for supporting the guide pulley —8—, the holes —a— the tongue —9— for the attachment of the escapement spring, a turned down tongue for connecting the escapement mechanism, the aperture —b— forming a working way for the escapement mechanism, are all punched and formed by few shearing and pressing operations.

The carriage member —10— is also also provided with a wedged groove —11— apt to fit on the rolling balls —31— in a durable manner; a turned up back edge —12— is provided with two slots to receive the nut and screw stops —13—14— adjustable in position to fix the margins for the writing.

The side edges of the member —10— are triangularly shaped and turned up at right angle to form the supports —15— for the platen —24—. A notch —16— is punched down at the middle portion of the back edge to contact with the upper side of the flange —2— and form with the two balls —31— a three points race plane for the carriage.

The slots —17— are punched down on the member —10— for the connection of the escapement rack —18— having its teeth pointing downwards. Holes —19— are provided to fix the arms —20— supporting the guide —21— for the spring brackets —22— bearing the rollers —23— which keep the writing paper adherent to the platen —24—.

Two slots —25— receive the ends of the turned down lugs of the feed plate —27—, said lugs being kept in position by wire loops —28—. In the holes —29— are fixed pins fitted with coil springs —30— forming a resilient cushion for the feed plate —27—.

The carriage and the bed plate are assembled together as shown at Fig. 4. Lifting movement of the carriage —10— is prevented by the turned over projections —4— and the roller —33—, the latter being pivoted to a resilient plate —34— fastened to the bed plate at the holes —a—, said roller acting on the upper side of the flange —12—.

The balls —31— are kept spaced apart by a connecting rod shown in dotted line at Fig. 1 (32).

Having now particularly described the nature of my invention and the manner in which the same is to be performed I claim:

In a carriage of the class described consisting of a bed member and a running member made of sheet metal, T-like turned over projections on the forward edge of said bed member, a plate support for the ribbon device at the forward edge, a turned up portion at right angle at the back edge, a tongue projection for the attachment of the bell lever, a tongue like projection for supporting a guiding pulley, a tongue projection for the attachment of the escapement spring a turned down tongue for connecting the escapement mechanism a rectangular aperture for the working of the escapement mechanism; a lengthwise wedged groove forming a raceway for two rolling balls, a wedged groove in the carriage member, a turned up back edge portion provided with two slots to receive the nut and screw stops for fixing the margins of the writing, turned upwards side triangular edges in said carriage member to form the support for the platen, a notch punched down at the back edge of said carriage member to contact with the upper side of the back flange of the bed member, slots on said carriage member to fix the escapement rack, holes in said carriage members to attach the arms of a bar guide for resilent bracket with rollers; two slots to receive lugs projecting from the feeding plate, holes in said carriage to receive coiled springs forming a resilient cushion for said feed plate, said lugs being entertained by wire loops, holes in said bed plate to fix a resilient plate with a roller resting on the back turned up edge of the said carriage member.

In testimony whereof I affix my signature.

ITALO BRASA.